United States Patent [19]

Kimura et al.

[11] Patent Number: 5,187,009
[45] Date of Patent: Feb. 16, 1993

[54] RUBBER/PLASTIC INSULATED POWER CABLES AND A JOINT THEREOF AND A METHOD FOR MANUFACTURING THE SAME

[75] Inventors: Hitoshi Kimura; Tetsuo Matsumoto, both of Ichihara; Michihiro Shimada, Nagoya, all of Japan

[73] Assignee: The Furukawa Electric Co., Ltd., Tokyo, Japan

[21] Appl. No.: 685,602

[22] Filed: Apr. 15, 1991

[30] Foreign Application Priority Data

Sep. 13, 1990 [JP] Japan .................................. 2-243075

[51] Int. Cl.$^5$ ...................... B44D 1/42; C08L 23/08; B05D 3/02
[52] U.S. Cl. .................................... 428/383; 428/364; 428/380; 526/265; 526/240; 526/211; 526/232
[58] Field of Search ...................... 428/364, 380, 383; 526/265

[56] References Cited

U.S. PATENT DOCUMENTS 3,632,440  1/1972  Preston ................ 428/900

Primary Examiner—Patrick J. Ryan
Assistant Examiner—Richard C. Weisberger
Attorney, Agent, or Firm—Frishauf, Holtz, Goodman & Woodward

[57] ABSTRACT

There is provided a rubber/plastic insulated power cable or a joint of power cables which comprises a conductor or a conductor joint having an inner semiconductor layer and an insulation layer, and if necessary, an outer semiconductor layer, formed thereon in the order named, at least one of these layers being formed of a crosslinked structure of an olefin resin composition containing an olefin resin, an organic peroxide, and 2,4-diphenyl-4-methyl-1-pentene. The 2,4-diphenyl-4-methyl-1-pentene serves to inhibit "amber" of the olefin resin composition by the organic peroxide used and to increase the degree of crosslinking of crosslinked structure. Also, the olefin resin with a high melting point can be used as a base resin. Therefore, the resultant power cable and joint have highly improved AC breakdown strength, impulse breakdown strength at a high temperature and much less generation of electrical trees due to "amber", so that they are useful particularly high-voltage application.

20 Claims, 1 Drawing Sheet

RUBBER/PLASTIC INSULATED POWER CABLES AND A JOINT THEREOF AND A METHOD FOR MANUFACTURING THE SAME

BACKGROUND OF THE INVENTION

The present invention relates to rubber/plastic insulated power cables with improved high-temperature properties and a joint thereof and a method for manufacturing the same.

PRIOR ART

A conventional rubber/plastic insulated power cable (hereinafter referred to simply as power cable) generally comprises a cable core which includes a conductor clad with an inner semiconductor layer and an insulation layer, or with an inner semiconductor layer, an insulation layer, and an outer semiconductor layer. These individual layers made from a resin composition which is prepared by blending a base resin, organic peroxide (crosslinking agent), antioxidant, etc. by means of a mixer, such as a ribbon mixer, in-line mixer and Banbury mixer, may be formed by extruding the resin composition from the extruder onto the peripheral surface of the conductor. Also, in case the organic peroxide and/or the antioxidant are liquid, they may be fed directly into the extruder, as the resin composition is extruded onto the conductor for extrusion coating of the layers. Thereafter, the resultant structure is heated under pressure to decompose the crosslinking agent blended with the base resin, so that crosslinking is effected by means of the resultant radicals.

Conventionally, moreover, power cables of the 154-kV class or higher are connected by the so-called mould joint method, as follows.

First, the respective conductors of two power cables are exposed at their end portions, and those portions of inner semiconductor layers, insulation layers, and outer semiconductor layers near the exposed end portions of the conductors are cut substantially in the desired shape of a cone. Thereafter, the exposed conductors are connected to each other, and a semiconductive tape or a heat-shrinkable semiconductive tube, which is made of an olefin resin composition containing conductive carbon black and the crosslinking agent, is wound or put on the conductor joint and the vicinities thereof to form a moulded inner semiconductor layer. Then, the moulded inner semiconductor layer is wound with an insulation tape made of an olefin resin composition compounded with the crosslinking agent, or is coated with an insulating resin compound blended with the crosslinking agent by extrusion, thereby forming a moulded insulation layer. Further, this moulded insulation layer is wound with the semiconductive tape or fitted with the heat-shrinkable semiconductive tube in the same manner as in the formation of the inner semiconductor layer, thereby forming an outer semiconductor layer. After these individual layers are formed in this manner, they are crosslinked by heating under pressure, whereby the power cables are connected together.

Conventionally, an organic peroxide, such as dicumyl peroxide or tert-butyl cumyl peroxide, is used as the crosslinking agent for the olefin resin, which constitutes the insulation layers and semiconductor layers of the power cables and a joint thereof. For the antioxidant, 4,4'-thiobis(3-methyl-6-tert-butylphenol) or bis[2-methyl-4-(3-n-alkylthiopropionyloxy)-5-tert-butylphenyl] sulfide is generally used.

The following processes are followed in manufacturing the power cable by forming the aforesaid layers on the conductor by extrusion coating or in forming the aforementioned joint. If the organic peroxide and the antioxidant used are dicumyl peroxide and 4,4'-thiobis(3-methyl-6-tert-butylphenol), respectively, which are solid at room temperature, they are mixed together with the base resin in the mixer to form a resin composition, whereupon the composition is extruded from the extruder for coating. If the organic peroxide and the antioxidant are tert-butyl cumyl peroxide and bis[2-methyl-4-(3-n-alkylthiopropionyloxy)-5-tert-butylphenyl] sulfide, respectively, which are liquid at room temperature, they are fed directly into the extruder for extrusion coating.

The conventional insulation layer is formed of a crosslinked olefin resin composition which has a melting point of 98° to 103° C. and a degree of crosslinking of 75 to 85% as measured by xylene extraction. It is known that the electrical properties (high-temperature insulation properties) of the resultant insulation layer can be improved by increasing the degree of crosslinking of the insulation layer and thereby increasing the melting point thereof.

In manufacturing or connecting the power cables, resins having higher melting points than conventional ones are tentatively used as materials for the insulation layer and semiconductor layers so that the high-temperature properties of the resultant power cables and the joint thereof, and therefore, the reliability thereof, are improved. In particular, this improvement is in a great demand at high-voltage power cables. However, the preset temperature of the extruder should be heightened in the case where the insulation layer and semiconductor layers made of a resin with a high melting point are extruded onto the conductor, or where the moulded insulation layer is extruded onto the conductor joint or the vicinities thereof during the extrusion moulded joint process. In this case, the following problem may arise under some conditions.

The resin composition is heated due to the shearing force of the screw of the extruder, so that its extrusion temperature becomes too high. Accordingly, the crosslinking agent such as dicumyl peroxide in the resin composition is partially decomposed, so that fine, amber-colored contaminants or the so-called "amber" comes about in an extruded piece. In order to improve the high-temperature properties of the power cables and the joint thereof, it is advisable to heighten the degree of crosslinking of the resin composition of each layer, and therefore, to blend the organic peroxide in plenty also. If this is done, however, the "amber" is liable to be caused. This "amber" triggers to insulation breakdown, thus lowering the properties, and therefore, the reliability, of the power cables. If the "amber" is frequent, moreover, protrusions develop on the surface of the extruded piece, thereby spoiling the external appearance of the cables. Protrusions also develop at the interfaces between the inner semiconductor layer, outer semiconductor layer, and insulation layer.

The aforesaid "amber" is caused not only during the extrusion coating, but also in the case when the powdered organic peroxide adhering to the wall surface of the mixer is decomposed by prolonged heating while the resin composition is being mixed in the mixer.

Such production of the "amber" in the mixer can be prevented by directly injecting the organic peroxide and the antioxidant in a liquid state into the mixer. If dicumyl peroxide and 4,4'-thiobis(3-methyl-6-tert-butyl-phenol) are used, however, they must be heated in order to be fused and liquefied, thereby making the required process complicated.

Moreover, during the manufacture of the power cable core or the manufacture of the tape for the taped moulded joint or of the insulation layer by extrusion in the extrusion mould joint process, a meshed screen for removing contaminants is attached to the distal end portion of the extruder. The mesh size of this screen tends to be diminished in order to reduce the amount of contaminants contained in the insulation layer and the like, thereby improving the reliability of the power cables and the cable joint. To remove contaminants by means of the fine-mesh screen, therefore, it is necessary to pass the resin composition through the screen meshes under high pressure. In this case, however, the resin composition is heated due to a shearing force produced when it passes through the screen meshes as the extrusion pressure increases. As a result, the temperature of the resin composition to be extruded becomes so high that the aforementioned "amber" increases.

On the other hand, an attempt has been made to increase the degree of crosslinking of the resin to thereby improve the high-temperature properties of the power cable. In this case, however, a larger quantity of crosslinking agent must be admixed, and therefore, the aforesaid "amber" increases and passable effects cannot be obtained in practice.

In manufacturing the power cables or connecting the same by the moulded joint method, therefore, the preset temperature of the extruder for the formation of the insulation layer and semiconductor layers should be set low enough to prevent "amber." This is the reason why the base resin has to be bound to an olefin resin with a relatively low melting point (about 110° C. at the maximum). In order to prevent the "amber," moreover, even prevailing used olefin resins require very strict preset temperature control.

Thus, in manufacturing or connecting the power cables, the "amber" is caused by the decomposition of the crosslinking agent during the extrusion coating of the insulation layer and semiconductor layers, and the lowering of the properties and reliability of the power cables cause a critical problem. Heretofore, however, there have not been found any power cables which can enjoy high reliability without entailing the "amber" when the insulation layer and semiconductor layers are formed from a resin composition having a higher melting point than conventional ones at a preset temperature of the extruder higher than in the conventional case or when the amount of the crosslinking agent admixed with the resin composition used for the insulation layer and semiconductor layers is increased to thereby increase the degree of crosslinking.

SUMMARY OF THE INVENTION

An object of the present invention is to provide rubber/plastic insulated power cables and a joint thereof, which are free from "amber" caused by the decomposition of a crosslinking agent and which can achieve excellent high-temperature electrical properties and high reliability by using a resin having a higher melting point than those of conventional resins for an insulation layer and semiconductor layers and at the same time increasing the degree of crosslinking.

According to the present invention, there is provided a rubber/plastic insulated power cable which comprises a conductor having an inner semiconductor layer and an insulation layer, and if necessary, an outer semiconductor layer, formed thereon in the order named, at least one of the layers being formed of a crosslinked structure of an olefin resin composition containing an olefin resin, an organic peroxide, and 2,4-diphenyl-4-methyl-1-pentene. Also provided is a joint of rubber/plastic insulated power cables, which comprises a conductor joint between two rubber/plastic insulated power cable, the conductor joint having an inner semiconductor layer and an insulation layer, and if necessary, an outer semiconductor layer, formed thereon or around the vicinities thereof in the order named, at least one of the layers being formed of a crosslinked structure of an olefin resin composition containing an olefin resin, an organic peroxide, and 2,4-diphenyl-4-methyl-1-pentene.

According to the present invention, moreover, there is provided a method for manufacturing a rubber/plastic insulated power cable, which comprises steps of: preparing a liquid mixture by dissolving an organic peroxide or/and an antioxidant in 2,4-diphenyl-4-methyl-1-pentene; preparing a resin composition by compounding the liquid mixture with an olefin resin; and forming the resin composition on the outer peripheral surface of a conductor by extrusion and then crosslinking the resultant structure, thereby successively forming an inner semiconductor layer and an insulation layer, and if necessary, an outer semiconductor layer.

According to the present invention, furthermore, there is provided a method for manufacturing a joint of rubber/plastic insulated power cables, which comprises steps of: preparing a liquid mixture by dissolving an organic peroxide or/and an antioxidant in 2,4-diphenyl-4-methyl-1-pentene; preparing a resin composition by compounding the liquid mixture with an olefin resin; and coating the resin composition on a conductor joint and around the vicinities thereof by extrusion and then crosslinking the resultant structure, thereby successively forming an inner semiconductor layer and an insulation layer, and if necessary, an outer semiconductor layer.

In the power cables and the joint thereof according to the present invention, the inner semiconductor layer, the insulation layer, and the outer semiconductor layer, formed on the peripheral surface of the conductor or the conductor joint, are each composed of a crosslinked structure of an olefin resin composition which contains the aforementioned materials as essential ingredients.

The inner semiconductor layer and the outer semiconductor layer further contain conductive carbon, such as furnace black, KETJEN black, and acetylene black, as a conductivity investing material. Preferably, the loading of this material ranges from 20 to 100 parts by weight as compared with 100 parts by weight of the olefin resin.

Available olefin resins for the base of the resin composition include low-density polyethylene, very-low-density polyethylene, linear low-density polyethylene, ethylene propylene rubber, ethylene-ethyl acrylate copolymer, ethylene-vinyl acetate copolymer, ethylene-acrylic acid copolymer, and ethylene-styrene copolymer, for example. These materials may be used singly or in a combination of two or more. Preferably, low-density polyethylene is used for the insulation layer of the power cable, as mentioned later, and ethylene-vinyl acetate copolymer, ethylene-ethyl acrylate copolymer, or a mixture of these copolymers, or a mixture of polyethylene and one of the aforesaid copolymers is used for the inner semiconductor layer and the outer semiconductor layer.

The organic peroxide for use as the crosslinking agent may be m-(tert-butylperoxyisopropyl)-isopropylbenzene, p-(tert-butylperoxyisopropyl)-isopropylbenzene, dicumyl peroxide, tert-butyl cumyl peroxide, or α,α'-bis(tert-butylperoxy-m-isopropyl)-benzene, for example.

With use of m-(tert-butylperoxyisopropyl)-isopropylbenzene or p-(tert-butylperoxyisopropyl)-isopropylbenzene, among the other organic peroxides, the preset temperature of an extruder can be set higher than in the case where the olefin resin composition containing dicumyl peroxide is used as the crosslinking agent. Accordingly, an olefin resin with a high melting point (about 110° C. or more), which conventionally had hardly been made available, can be used as the base resin. Thus, the high-temperature properties and durability of the power cables and the joint thereof, and therefore, the reliability of the cables, can be greatly improved.

Among the aforesaid organic peroxides, m-(tert-butylperoxyisopropyl)-isopropylbenzene and p-(tert-butylperoxyisopropyl)-isopropylbenzene can be synthesized by causing isopropyl α,α'-dimethylbenzylcarbinol of the meta- or para-type to react to tert-butyl hydroperoxide under the existence of an acid catalyst at 40° C. or thereabout. These materials are viscous liquids having a melting point of −10° C. or below. The respective structural formulas of m- and p-(tert-butylperoxyisopropyl)-isopropylbenzenes are given, as follows:

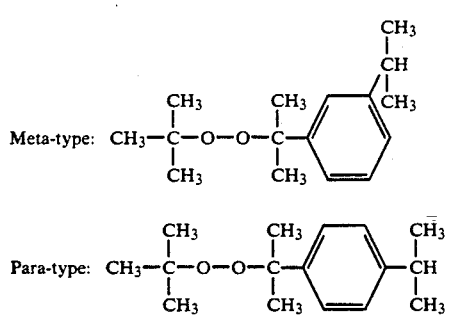

Preferably, the loading of each of these organic peroxides ranges from 0.5 to 10 parts by weight as compared with 100 parts by weight of the olefin resin. If the loading is less than 0.5 part by weight, a satisfactory crosslinking effect cannot be reserved fully. If the loading exceeds 10 parts by weight, on the contrary, the crosslinking advances to an excessive degree such that "amber" is liable to occur. Further preferably, the loading ranges from 1.5 to 3 parts by weight as compared with 100 parts by weight of the olefin resin.

If 2,4-diphenyl-4-methyl-1-pentene, along with the above organic peroxide, is compounded with the olefin resin, "ambering" can be prevented and at the same time the dgree of crosslinking can be increased. Shortly, even if the preset temperature of the extruder is further increased when the insulation layer and semiconductor layers are formed for coating, the "amber" can be prevented, whereby an olefin resin having a higher melting point can be used as the base resin, thus enabling the degree of crosslinking to be further increased.

Preferably, the loading of 2,4-diphenyl-4-methyl-1-pentene ranges from 0.1 to 5 parts by weight as compared with 100 parts by weight of the olefin resin. If the loading is less than 0.1 part by weight, the aforesaid effect is not good enough to prevent "amber." If the loading exceeds 5 parts by weight, on the other hand, the degree of crosslinking can hardly be increased to the purpose. Further preferably, the loading ranges from 0.5 to 1.0 part by weight as compared with 100 parts by weight of the olefin resin.

Usually, 2,4-diphenyl-4-methyl-1-pentene can be synthesized by dimerizing α-methylstyrene under the existence of an acid catalyst.

According to the present invention, the insulation layer and the inner and outer semiconductor layers are each composed as a crosslinked structure of an olefin resin composition which contains the aforementioned materials as essential ingredients. In the insulation layer, moreover, the crosslinked structure preferably has a melting point of 105° C. or more and a degree of crosslinking of 86% as measured by xylene extraction (JISC 3005).

Thus, by increasing the melting point and the degree of crosslinking of the insulation layer in comparison with the conventional case, the mechanical properties of the insulation layer at high temperatures can be improved and the crystalline fusion of the resin composition of said insulation layer can be restricted. As a result, the electrical properties (AC breakdown strength, impulse breakdown strength) of the cable at high temperatures can be improved and the generation of electrical trees due to contaminants can be reduced. These advantageous effects can be furthered by eliminating the "amber" which triggers AC breakdown, impulse breakdown, and the generation of electrical trees.

If necessary, furthermore, the olefin resin may be mixed with an antioxidant, lubricant, or filler.

Available antioxidants include 4,4'-thiobis(3-methyl-6-tert-butylphenol), bis[2-methyl-4-(3-n-alkylthiopropionyloxy)-5-tert-butylphenyl] sulfide, 2,5-di-tert-butyl hydroquinone, 2,6-di-tert-butyl-p-cresol, 2,2'-thiodiethylenebis-[3-(3,5-di-tert-butyl-4-hydroxyphenyl) propionate], dilauryl thiodipropionate, and distearyl thiodipropionate, for example. These materials may be used singly or in a combination of two or more. Among these antioxidants, 4,4'-thiobis(3-methyl-6-tert-butylphenol) and bis[2-methyl-4-(3-n-alkylthiopropionyloxy)-5-tert-butylphenyl] sulfide are preferred in particular.

Preferably, the loading of these antioxidants ranges from 0.05 to 1.0 part by weight as compared with 100 parts by weight of the olefin resin. If the loading is less than 0.05 part by weight, oxidative deterioration of the insulation layer cannot be effectively prevented. If the loading exceeds 1.0 part by weight, on the other hand, the crosslinking reaction is retarded, so that the degree of crosslinking is lowered.

The aforesaid organic peroxide and antioxidant may be singly compounded with the base resin. However, one or both of them may be dissolved in 2,4-diphenyl-4-methyl-1-pentene to form a liquid mixture. If necessary, in this case, the resultant liquid mixture may be slightly heated so that the organic peroxide and the antioxidant are compounded in a fully dissolved state. In this case, the resin composition can be fed directly into the extruder, so that "amber" can be effectively prevented.

Available lubricants include stearic acid, oxyaliphatic acid, oleic acid amide, ethylene glycol monostearate, cetyl alcohol, and stearyl alcohol, for example.

Fillers include the aforementioned conductive carbon, silicon halide, and zinc sterate, for example.

In the power cables according to the present invention, the semiconductor layers and insulation layers may be formed by extruding the aforesaid olefin resin composition onto the peripheral surfaces of the conductors or conductor joints and crosslinking the resin composition. Alternatively, the olefin resin composition may be formed into a semiconductor tape or insulator tape so that the tape is wound around the conductors or conductor joints.

FIG. 1 shows an example of a cross-sectional configuration of the power cable according to the present invention. The power cable 10 can be manufactured as follows. An inner semiconductor layer 12 and an insulation layer 13, and if necessary, an outer semiconductor layer 14, are formed on the peripheral surface of a conductor 11 by a conventional method using the aforesaid resin composition. Thereafter, a semiconducting cloth tape 15, a metallic shielding layer 16, a hold-down tape 17, and a sheath layer 18 are further formed on the resultant structure.

FIG. 2 shows an example of an arrangement of a joint 30 between power cables according to the present invention. Two power cables 20 can be connected by the conventional moulded joint method, for example. In this method, the respective ends of the cables 20 are first trimmed so that conductors 21, inner semiconductor layers 22, insulation layers 23, and outer semiconductor layers 24 are exposed individually, as shown in FIG. 2. Then, the two conductors 21 are connected to each other by means of a ferrule 31. The respective inner semiconductor layers 22, insulation layers 23, and outer semiconductor layers 24 of the two power cables 20 to be connected, which are not specifically restricted in material, should preferably be formed of a crosslinked structure of an olefin resin composition according to the present invention.

Then, a semiconductor tape or a heat-shrinkable semiconductive tube, made of the aforesaid resin composition, is wound or put on the ferrule 31 and fusion-bonded thereto, thereby forming a moulded inner semiconductor layer 32, so that the inner semiconductor layers 22 at the opposite ends of the layer 32 are connected. After the moulded inner semiconductor layer 32 is formed in this manner, moulds for resin moulding are mounted so that a moulded insulation layer 33, made of the aforesaid resin composition, is formed on the peripheral surface of the layer 32 by heat moulding and then heat-crosslinked. An moulded outer semiconductor layer 34, a conductive self-adhesive tape 35, a shield layer 36, and a anticorrosion tape 37 are wound successively around the insulation layer 33, thus forming despective layers. The aforesaid resin composition is used for the formation of the moulded outer semiconductor layer 34. A protective tube, formed of a copper tube 38 and an anticorrosion layer 39, is mounted on the resultant structure, and is sealed by means of hand-wound anticorrosion layers 40. Therafter, the gap between the tape 37 and the protective tube is filled up with a waterproof compound layer 41.

In the power cables and the joint thereof according to the present invention, the resin composition, which forms the insulation layers and semiconductor layers, etc., contains 2,4-diphenyl-4-methyl-1-pentene, which inhibits "amber" by an organic peroxide for use as a crosslinking agent, and heightens the degree of crosslinking. When this resin composition is used to cover the conductors and the regions near the conductor joint, therefore, the preset temperature of the extruder can be set higher than in the cases of the conventional power cables. It becomes possible, therefore, to use an olefin resin with a high melting point (about 110° C. or more) which conventionally had hardly been made available. Thus, the AC breakdown strength and impulse breakdown strength at high temperature may be improved and the generation of electrical trees due to contaminants may be lessened. This upgrading greatly strengthens the reliability on the power cable and the joint.

EMBODIMENTS AND CONTROLS

Figure 1:
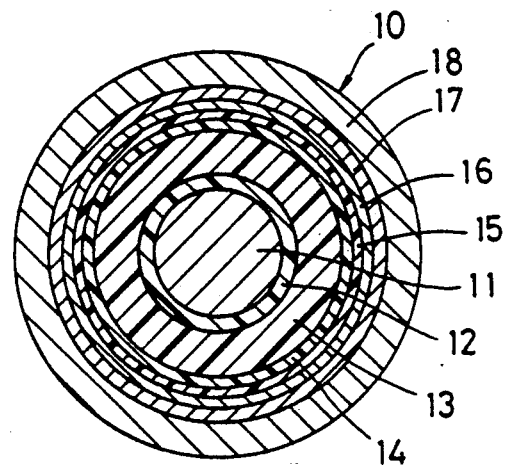
FIG. 1 is a cross-sectional view showing of a power cable according to the present invention.
Figure 2:
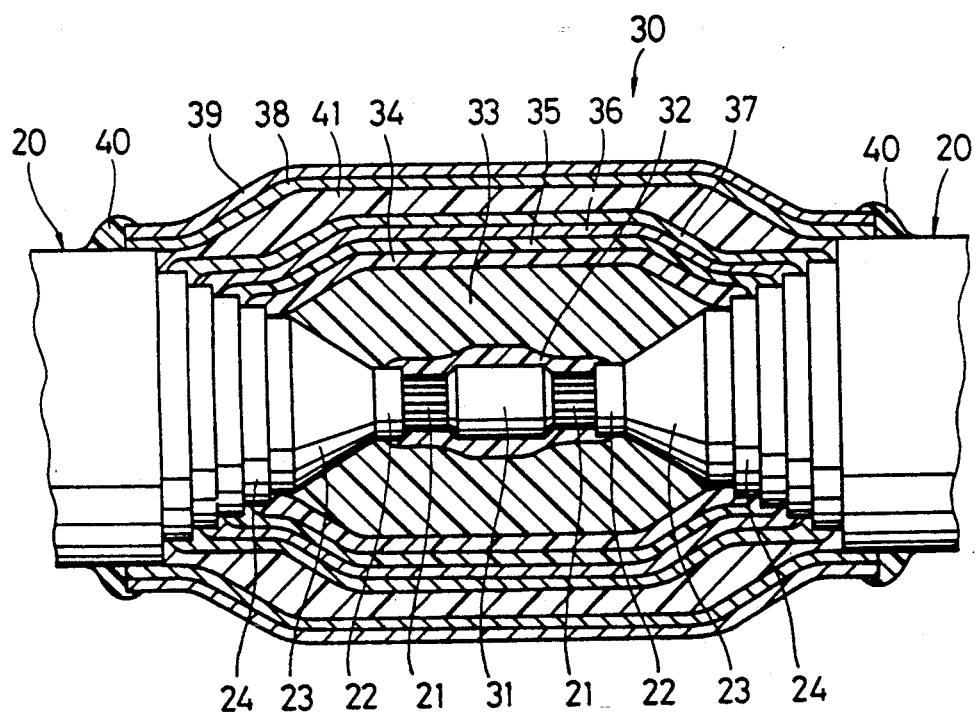
FIG. 2 is a partial sectional view showing of a joint between power cables according to the present invention.

Embodiments 1 to 5 and Controls 1 and 2

A 600-mesh screen was attached to the extrusion orifice of an extruder. Then, only resin compositions of the formulations shown in Table 1 were extruded into tapes of 200-μm thickness at the listed temperatures by means of the extruder, and the appearance of each resultant tape was visually observed. In Table 1, which shows the results of this visual inspection, circles, crosses, and triangles represent articles with good appearance, defectives, and partial defectives, respectively.

TABLE 1

|  | Embodiment 1 | Embodiment 2 | Embodiment 3 | Embodiment 4 | Embodiment 5 | Control 1 | Control 2 |
|---|---|---|---|---|---|---|---|
| Low-density polyethylene a[1] | 100 | 100 | 100 | 100 | 100 | 100 | 100 |
| Dicumyl peroxide | 2.5 | 3.0 | — | — | — | 2.5 | 3.0 |
| Mixture of crosslinking agent[2] | — | — | 2.5 | 3.0 | 4.0 | — | — |
| 2,4-diphenyl-4-methyl-1-pentene | 0.5 | 0.2 | 0.5 | 1.0 | 1.5 | — | — |
| Antioxidant a[3] | 0.2 | 0.2 | 0.2 | 0.2 | 0.3 | 0.2 | 0.3 |
| Preset temperature of extruder |  |  |  |  |  |  |  |
| 120° C. | ○ | ○ | ○ | ○ | ○ | ○ | ○ |
| 125° C. | ○ | ○ | ○ | ○ | ○ | ○ | ○ |
| 130° C. | ○ | ○ | ○ | ○ | ○ | △ | X |
| 135° C. | ○ | ○ | ○ | ○ | ○ | X | X |
| 140° C. | △ | △ | ○ | ○ | ○ | X | X |

[1]M. I. = 1.0 g/10 min, density = 0.92 g/cm$^3$
[2]Mixture of m-(tert-butylperoxyisopropyl)-isopropylbenzene and p-(tert-butylperoxyisopropyl)-isopropylbenzene in the ratio 3:2 by weight
[3]4,4'-thiobis(3-methyl-6-tert-butylphenol)

Embodiments 6 to 11 and Controls 3 to 5

An inner semiconductor layer, an insulation layer, and an outer semiconductor layer were successively formed on each of conductors by a conventional coating method using the resin compositions shown in Table 2. The preset temperature of the extruder and the mesh number of the screen at the extrusion orifice were 135° C. and 600, respectively, when the insulation layer was being formed, and 120° C. and 350, respectively, when the inner and outer semiconductor layers were being formed.

The insulation layer used in each of Embodiments 9 and 10 was manufactured by mixing an intimate mixture of a crosslinking agent and an antioxidant a with 2,4-diphenyl-4-methyl-1-pentene to form a liquid mixture, and then feeding the resultant liquid mixture directly into the extruder for extrusion coating.

In Embodiment 11, a resin composition was prepared using a liquid mixture obtained by mixing the intimate crosslinking agent mixture, antioxidant a, and 2,4-diphenyl-4-methyl-1-pentene.

The resultant structures were pressurized and heated at 10 kg/cm$^2$ and 270° C. for a crosslinking reaction, and a metallic shield layer and a sheath layer were formed on each of the structure by the conventional coating method. Thereupon, power cables (conductor size: 250 mm$^2$, insulation layer thickness: 11 mm) for 66-kV service were obtained.

The respective insulation layers of these power cables were examined for the presence of "amber," melting point, and degree of crosslinking.

The melting point and the degree of crosslinking were measured on the insulation layers cut away from the individual power cables by means of a differential scanning calorimeter (DSC) and by xylene extraction (JISC 3005), respectively. The DSC was used to measure the melting point within a temperature range of 30° to 150° C. at a rate of temperature increase of 10° C./min, and the bottom value of the resultant chart was regarded as the melting point. In discriminating the presence of "amber" in each insulation layer, a slice of 0.5-mm thickness was cut from the insulation layer, and part of it having a volume of 1 cm$^3$ was observed by means of a microscope (magnification: 100). These power cables were subjected to an AC breakdown test and an impulse breakdown test with each conductor being energized so that its temperature was 90° C. After 10 days of application of 90-kV AC voltage at 50 Hz, each insulation layer was observed by means of the microscope, and those contaminants, out of 100 contaminants, which suffered electrical trees were counted. Table 2 collectively shows the results of these tests or measurements.

TABLE 2

| | Embodiment 6 | Embodiment 7 | Embodiment 8 | Embodiment 9 |
|---|---|---|---|---|
| Inner semiconductor layer | | | | |
| Outer semiconductor layer | | | | |
| Ethylen-ethyl acrylate copolymer[1] | 100 | 100 | 100 | 100 |
| α, α'-bis(tert-butylperoxy-m-isopropyl)-benzene | 0.6 | 0.6 | — | — |
| Mixture of crosslinking agent[2] | — | — | 0.7 | 0.7 |
| 2,4-diphenyl-4-methyl-1-pentene | 0.5 | 0.2 | 0.5 | 0.5 |
| Antioxidant a[3] | 0.2 | 0.3 | 0.2 | 0.3 |
| Acetylene black | 60 | 60 | 60 | 60 |
| Insulation layer | | | | |
| Low-density polyethylene a[4] | 100 | 100 | 100 | 100 |
| Low-density polyethylene b[5] | — | — | — | — |
| Dicumyl peroxide | 2.5 | 3.0 | — | — |
| Mixture of crosslinking agent[2] | — | — | 2.5 | 2.5 |
| 2,4-diphenyl-4-methyl-1-pentene | 0.5 | 0.2 | 0.5 | 0.5 |
| Antioxidant a[3] | 0.2 | — | 0.2 | — |
| Antioxidant b[6] | — | 0.4 | — | 0.5 |
| "Amber" in insulation layer: None/Noticed | None | None | None | None |
| Melting point of insulation layer (°C.) | 102 | 103 | 103 | 103 |
| Degree of crosslinking of insulation layer (%) | 90 | 89 | 87 | 87 |
| 90° C.-AC breakdown strength (kV/mm) | 43 | 42 | 40 | 40 |
| 90° C.-impulse breakdown strength (kV/mm) | 90 | 87 | 86 | 87 |
| Number of contaminants suffering electrical trees(per 100)[7] | 1 | 2 | 2 | 3 |

| | Embodiment 10 | Embodiment 11 | Control 3 | Control 4 | Control 5 |
|---|---|---|---|---|---|
| Inner semiconductor layer | | | | | |
| Outer semiconductor layer | | | | | |
| Ethylen-ethyl acrylate copolymer[1] | 100 | 100 | 100 | 100 | 100 |
| α, α'-bis(tert-butylperoxy-m-isopropyl)-benzene | — | — | 0.6 | 0.7 | 0.7 |
| Mixture of crosslinking agent[2] | 0.8 | 0.8 | — | — | — |
| 2,4-diphenyl-4-methyl-1-pentene | 0.5 | 0.5 | — | — | — |
| Antioxidant a[3] | 0.2 | 0.3 | 0.2 | 0.2 | 0.3 |
| Acetylene black | 60 | 60 | 60 | 60 | 60 |
| Insulation layer | | | | | |
| Low-density polyethylene a[4] | — | — | 100 | 100 | 100 |
| Low-density polyethylene b[5] | 100 | 100 | — | — | — |
| Dicumyl peroxide | — | — | 2.0 | 2.5 | 3.0 |
| Mixture of crosslinking agent[2] | 2.5 | 2.5 | — | — | — |
| 2,4-diphenyl-4-methyl-1-pentene | 0.5 | 0.5 | — | — | — |
| Antioxidant a[3] | 0.2 | — | 0.2 | 0.2 | 0.3 |
| Antioxidant b[6] | — | 0.5 | — | — | — |
| "Amber" in insulation layer: None/Noticed | None | None | None | Noticed | Noticed |
| Melting point of insulation layer (°C.) | 109 | 108 | 103 | 102 | 102 |
| Degree of crosslinking of insulation layer (%) | 88 | 89 | 81 | 83 | 84 |
| 90° C.-AC breakdown strength (kV/mm) | 42 | 42 | 33 | 35 | 39 |
| 90° C.-impulse breakdown strength (kV/mm) | 104 | 102 | 86 | 84 | 80 |

TABLE 2-continued

| Number of contaminants suffering electrical trees(per 100)[7] | 0 | 0 | 88 | 79 | 70 |
|---|---|---|---|---|---|

[1] M. I. = 15 g/10 min, density = 0.92 g/cm³
[2] Mixture of m-(tert-butylperoxyisopropyl)-isopropylbenzene and p-(tert-butylperoxyisopropyl)-isopropylbenzene in the ratio 3:2 by weight
[3] 4,4'-thiobis(3-methyl-6-tert-butylphenol)
[4] M. I. = 1.0 g/10 min, density = 0.92 g/cm³
[5] M. I. = 1.0 g/10 min, density = 0.928 g/cm³
[6] Bis [2-methyl-4-(3-n-alkylthiopropionyloxy)-5-tert-butylphenyl] sulfide
[7] Number of those contaminants, among 100 contaminants, which suffered electrical trees after 10 days of application of 200-kV AC voltage at 50 Hz and 90° C.

Embodiments 12 to 17 and Controls 6 to 8

The respective conductors of the 66-kV power cables of Embodiments 6 to 11 and Controls 3 to 5 were exposed at their end portions, the exposed portions of the conductors and their surroundings were sharpened like pencils, and the exposed conductors were connected by means of a ferrule. A conventional semiconductive tape was wound around and fusion-bonded to the respective peripheral surfaces of the conductors of the cables connected by means of the ferrule, whereby a moulded inner semiconductor layer was formed for each joint. Thereafter, two split moulds were put on each of the conductor joints, and the resin compositions shown in Table 3 were extrusively injected into the molds at 135° C. by means of an extruder of 25-mm diameter at a preset temperature of 135° C. Then, the moulds were heated to 200° C. for crosslinking, whereupon a moulded insulation layer was formed. Subsequently, an outer semiconductor layer, formed of a heat-shrinkable conductive crosslinked polyethylene, and a shield layer, sheath were put on each of the resultant structures, whereupon several cable joints were obtained. The respective insulation layers of these cable joints were examined for the presence of "amber," melting point, and degree of crosslinking in the same manner as in the cases of Embodiments 6 to 11. Table 3 collectively shows the results of this examination.

What is claimed is:

1. A rubber/plastic insulated power cable comprising a conductor having an inner semiconductor layer and an insulation layer, and optionally, an outer semiconductor layer, formed thereon in the order named, at least one of said layers being formed of a crosslinked polyolefin composition containing at least one polyolefin selected from the group consisting of an ethylene homopolymer and an ethylene copolymer, 0.5 to 10 parts by weight of an organic peroxide, and 0.1 to 5 parts by weight of 2,4-diphenyl-4-methyl-1-pentene, based on 100 parts by weight of said polyolefin.

2. The rubber/plastic insulated power cable according to claim 1, wherein said polyolefin composition further contains 4,4'-thiobis(3-methyl-6-tert-butylphenol) and/or bis[2-methyl-4-(3-n-alkylthiopropionyloxy)-5-tert-butylphenyl] sulfide as an antioxidant or antioxidants.

3. The rubber/plastic insulated power cable according to claim 1, wherein said organic peroxide is m-(tert-butylperoxyisopropyl)-isopropylbenzene or/and p-(tert-butylperoxyisopropyl)-isopropylbenzene.

4. The rubber/plastic insulated power cable according to any one of claims 1 to 3, wherein said polyolefin composition is formed by compounding 0.5 to 3 parts by weight of m-(tert-butylperoxyisopropyl)-isopropylbenzene or/and p-(tert-butylperoxyisopropyl)-isopropylbenzene with 0.2 to 1.5 parts by weight of said 2,4-

TABLE 3

| | Embodiment 12 | Embodiment 13 | Embodiment 14 | Embodiment 15 |
|---|---|---|---|---|
| Moulded insulation layer | | | | |
| Low-density polyethylene a[1] | 100 | 100 | 100 | 100 |
| Low-density polyethylene b[2] | — | — | — | — |
| Dicumyl peroxide | 2.5 | 3.0 | — | — |
| Mixture of crosslinking agent[3] | — | — | 2.5 | 2.5 |
| 2,4-diphenyl-4-methyl-1-pentene | 0.5 | 0.2 | 0.5 | 0.5 |
| Antioxidant a[4] | 0.2 | — | 0.2 | — |
| Antioxidant b[5] | — | 0.4 | — | 0.5 |
| "Amber" in insulation layer: None/Noticed | None | None | None | None |
| Melting point of insulation layer (°C.) | 102 | 103 | 103 | 103 |
| Degree of crosslinking of insulation layer (%) | 89 | 89 | 87 | 86 |
| 90° C.-AC breakdown strength (kV/mm) | 416 | 426 | 386 | 417 |
| 90° C.-impulse breakdown strength (kV/mm) | 890 | 857 | 853 | 854 |

| | Embodiment 16 | Embodiment 17 | Control 6 | Control 7 | Control 8 |
|---|---|---|---|---|---|
| Moulded insulation layer | | | | | |
| Low-density polyethylene a[1] | — | — | 100 | 100 | 100 |
| Low-density polyethylene b[1] | 100 | 100 | — | — | — |
| Dicumyl peroxide | — | — | 2.0 | 2.5 | 3.0 |
| Mixture of crosslinking agent[3] | 2.5 | 2.5 | — | — | — |
| 2,4-diphenyl-4-methyl-1-pentene | 0.5 | 0.5 | — | — | — |
| Antioxidant a[4] | 0.2 | — | 0.2 | 0.2 | 0.3 |
| Antioxidant b[5] | — | 0.5 | — | — | — |
| "Amber" in insulation layer: None/Noticed | None | None | None | Noticed | Noticed |
| Melting point of insulation layer (°C.) | 109 | 108 | 103 | 102 | 102 |
| Degree of crosslinking of insulation layer (%) | 87 | 88 | 81 | 82 | 83 |
| 90° C.-AC breakdown strength (kV/mm) | 418 | 76 | 49 | 57 | 53 |
| 90° C.-impulse breakdown strength (kV/mm) | 1030 | 1021 | 848 | 846 | 830 |

[1] M. I. = 1.0 g/10 min, density = 0.92 g/cm³
[2] M. I. = 1.0 g/10 min, density = 0.928 g/cm³
[3] Mixture of m-(tert-butylperoxyisopropyl)-isopropylbenzene and p-(tert-butylperoxyisopropyl)-isopropylbenzene in the ratio 3:2 by weight
[4] 4,4'-thiobis(3-methyl-6-tert-butylphenol)
[5] Bis [2-methyl-4-(3-n-alkylthiopropionyloxy)-5-tert-butylphenyl] sulfide diphenyl-4-methyl-1-pentene, based on 100 parts by weight of said polyolefin.

5. The rubber/plastic insulated power cable according to claim 1, wherein said insulation layer is formed of a crosslinked polyolefin composition, an organic peroxide, and 2,4-diphenyl-4-methyl-1-pentene, said crosslinked composition having a melting point of 105° C. or more and a degree of crosslinking of 86% as measured by xylene extraction (JISC 3005).

6. A method for manufacturing a rubber/plastic insulated power cable, comprising steps of:
preparing a liquid mixture by dissolving an organic peroxide or/and an antioxidant in 2,4-diphenyl-4-methyl-1-pentene;
preparing a resin composition by compounding said liquid mixture with an olefin resin; and
forming said resin composition on the outer peripheral surface of a conductor by extrusion and then crosslinking the resultant structure, thereby successively forming an inner semiconductor layer and an insulation layer, and if necessary, an outer semiconductor layer.

7. A joint of rubber/plastic insulated power cables, comprising a conductor joint between two rubber/plastic insulated power cables, said conductor joint having an inner semiconductor layer and a moulded insulation layer, and optionally, an outer semiconductor layer, formed thereon or around the vicinities thereof in the order named, at least one of said layers being formed of a crosslinked polyolefin composition containing at least a polyolefin selected from the group consisting of an ethylene homopolymer and an ethylene copolymer, 0.5 to 10 parts by weight of an organic peroxide, and 0.1 to 5 parts by weight of 2,4-diphenyl-4-methyl-1-pentene, based on 100 parts by weight of said polyolefin.

8. The joint of rubber/plastic insulated power cables according to claim 7, wherein said polyolefin composition further contains 4,4'-thiobis(3-methyl-6-tert-butylphenol) and/or bis[2-methyl-4-(3-n-alkylthiopropionyloxy)-5-tert-butylphenyl] sulfide as an antioxidant or antioxidants.

9. The joint of rubber/plastic insulated power cables according to claim 7 or 8, wherein said organic peroxide is m-(tert-butylperoxyisopropyl)-isopropylbenzene or/and p-(tert-butylperoxyisopropyl)-isopropylbenzene.

10. The joint of rubber/plastic insulated power cables according to claim 7 or 8, wherein said polyolefin composition is formed by compounding 0.5 to 3 parts by weight of m-(tert-butylperoxyisopropyl)-isopropylbenzene or/and p-(tert-butylperoxyisopropyl)-isopropylbenzene with 0.2 to 1.5 parts by weight of said 2,4-diphenyl-4-methyl-1-pentene, based on 100 parts by weight of said polyolefin.

11. The joint of rubber/plastic insulated power cables according to claim 7, wherein said moulded insulation layer is formed of a crosslinked polyolefin composition containing an olefin resin, an organic peroxide, and 2,4-diphenyl-4-methyl-1-pentene, said crosslinked structure having a melting point of 105° C. or more and a degree of crosslinking of 86% as measured by xylene extraction.

12. A method for manufacturing a joint of rubber/plastic insulated power cables, comprising steps of:
preparing a liquid mixture by dissolving an organic peroxide or/and an antioxidant in 2,4-diphenyl-4-methyl-1-pentene;
preparing a resin composition by compounding said liquid mixture with an olefin resin; and
forming said resin composition on a conductor joint and around the vicinities thereof by extrusion and then crosslinking the resultant structure, thereby successively forming an inner semiconductor layer and an insulation layer, and if necessary, an outer semiconductor layer.

13. The rubber/plastic insulated power cable according to claim 1, wherein the polyolefin composition comprises a polyolefin selected from the group consisting of ethylene-vinyl acetate copolymer and ethylene-ethyl acrylate copolymer.

14. The rubber/plastic insulated power cable according to claim 3, wherein the organic peroxide is in an amount of 1.5 to 3 parts by weight, based on 100 parts by weight of said polyolefin.

15. The rubber/plastic insulated power cable according to claim 14, wherein the 2,4-diphenyl-4-methyl-1-pentene is in an amount of 0.5 to 1 part by weight, based on 100 parts by weight of said polyolefin.

16. The rubber/plastic insulated power cable according to claim 2, wherein the antioxidant is in an amount of 0.05 to 1 part by weight, based on 100 parts by weight of said polyolefin.

17. The joint of rubber/plastic insulated power cables according to claim 7, wherein the polyolefin composition comprises a polyolefin selected from the group consisting of ethylene-vinyl acetate copolymer and ethylene-ethyl acrylate copolymer.

18. The joint of rubber/plastic insulated power cables according to claim 7, wherein the organic peroxide is m-(tert-butylperoxyisopropyl)-isopropylbenzene or p-(tert-butylperoxyisopropyl)-isopropylbenzene and said organic peroxide is in an amount of 1.5 to 3 parts by weight, based on 100 parts by weight of said polyolefin.

19. The joint of rubber/plastic insulated power cables according to claim 18, wherein the 2,4-diphenyl-4-methyl-1-pentene is in an amount of 0.5 to 1 part by weight, based on 100 parts by weight of said polyolefin.

20. The joint of rubber/plastic insulated power cables according to claim 8, wherein the antioxidant is in an amount of 0.05 to 1 part by weight, based on 100 parts by weight of said polyolefin.

* * * * *